United States Patent
Seo et al.

(10) Patent No.: US 9,967,842 B2
(45) Date of Patent: May 8, 2018

(54) METHOD FOR DETECTING SYNCHRONIZATION SIGNAL FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Daewon Seo, Seoul (KR); Hanbyul Seo, Seoul (KR); Hakseong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/035,741

(22) PCT Filed: Nov. 4, 2014

(86) PCT No.: PCT/KR2014/010504
§ 371 (c)(1),
(2) Date: May 10, 2016

(87) PCT Pub. No.: WO2015/069000
PCT Pub. Date: May 14, 2015

(65) Prior Publication Data
US 2016/0316442 A1    Oct. 27, 2016

Related U.S. Application Data

(60) Provisional application No. 61/902,771, filed on Nov. 11, 2013, provisional application No. 61/904,447, filed on Nov. 14, 2014.

(51) Int. Cl.
*H04J 3/06*    (2006.01)
*H04W 56/00*    (2009.01)
(Continued)

(52) U.S. Cl.
CPC ......... *H04W 56/001* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2011/0268101 A1* 11/2011 Wang .................... H04L 5/0053
370/344
2012/0258706 A1  10/2012 Yu et al.
(Continued)

FOREIGN PATENT DOCUMENTS

KR   10-2013-0029355    3/2013
KR   10-2013-0035964    4/2013
(Continued)

OTHER PUBLICATIONS

U.S. Appl. No. 61/898,973, Sartori, "System and Method for Transmitting a Synchronization Signal".*
(Continued)

*Primary Examiner* — Kwang B Yao
*Assistant Examiner* — Juvena Loo
(74) *Attorney, Agent, or Firm* — Lee Hong Degerman Kang Waimey

(57) ABSTRACT

The present invention relates to a method in which a user equipment transmits and receives a synchronization signal of the user equipment for device-to-device (D2D) communication in a wireless communication system. Specifically, the method comprises a step of monitoring the synchronization signal for the D2D communication (D2DSS), wherein the D2DSS is assigned in an interval of a multiple raster unit from a center frequency.

9 Claims, 13 Drawing Sheets

(51) Int. Cl.
    *H04L 5/00*     (2006.01)
    *H04L 27/26*     (2006.01)
    *H04W 76/02*     (2009.01)
    *H04W 72/04*     (2009.01)

(52) U.S. Cl.
    CPC ......... *H04L 27/2692* (2013.01); *H04W 56/00* (2013.01); *H04W 72/042* (2013.01); *H04W 72/0413* (2013.01); *H04W 76/023* (2013.01)

(56) References Cited

U.S. PATENT DOCUMENTS

| | | | | |
|---|---|---|---|---|
| 2014/0112194 | A1* | 4/2014 | Novlan | H04W 8/005 370/254 |
| 2014/0328329 | A1* | 11/2014 | Novlan | H04W 72/042 370/336 |
| 2014/0334354 | A1* | 11/2014 | Sartori | H04W 8/005 370/280 |
| 2015/0124579 | A1* | 5/2015 | Sartori | H04J 11/00 370/210 |
| 2015/0156619 | A1* | 6/2015 | Fodor | H04W 8/005 455/434 |
| 2016/0183276 | A1* | 6/2016 | Marinier | H04W 72/02 370/329 |
| 2016/0227496 | A1* | 8/2016 | Panteleev | H04W 36/0055 |
| 2016/0286507 | A1* | 9/2016 | Yang | H04W 8/005 |

FOREIGN PATENT DOCUMENTS

| | | |
|---|---|---|
| KR | 10-2013-0082062 | 7/2013 |
| WO | 2011-133004 | 10/2011 |

OTHER PUBLICATIONS

U.S. Appl. No. 61/901,694, Yang, "Synchronization Signal Design for Device to Device Operation".*
PCT International Application No. PCT/KR2014/010504, Written Opinion of the International Searching Authority dated Jan. 29, 2015, 16 pages.

* cited by examiner

FIG. 2
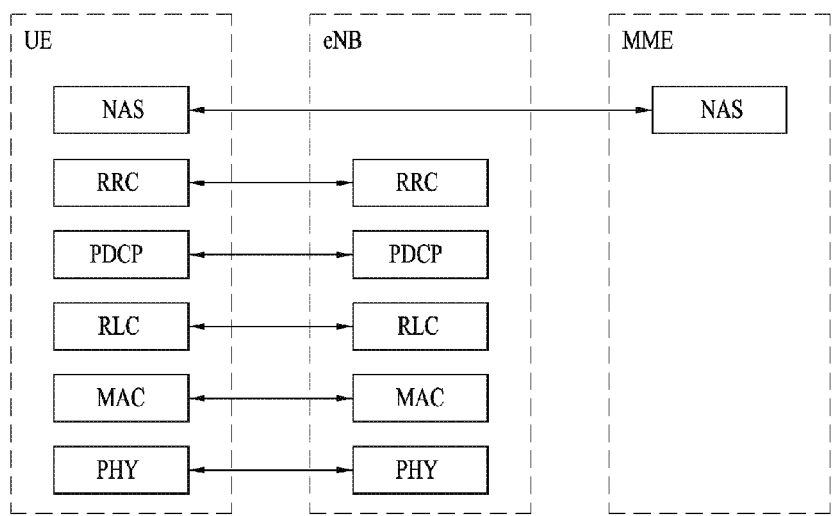
(a) control-plane protocol stack
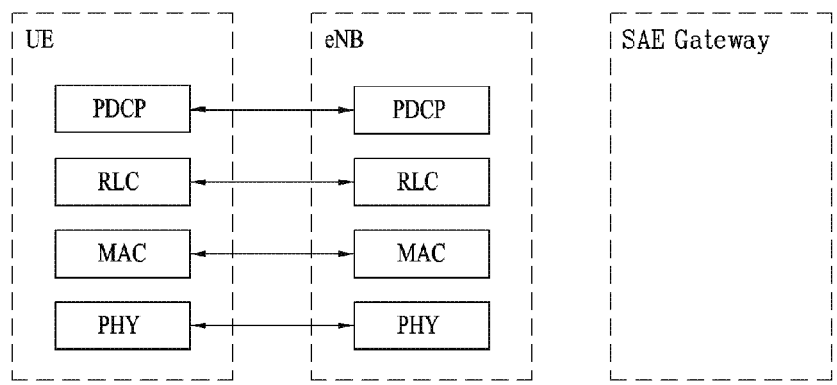
(b) user-plane protocol stack (a)           (b)

(a) Raster-based allocation (b) RB-based allocation

METHOD FOR DETECTING SYNCHRONIZATION SIGNAL FOR DEVICE-TO-DEVICE (D2D) COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/010504, filed on Nov. 4, 2014, which claims the benefit of U.S. Provisional Application Nos. 61/902,771, filed on Nov. 11, 2013, and 61/904,447, filed on Nov. 14, 2013, the contents of which are all hereby incorporated by reference herein in their entirety.

TECHNICAL FIELD

The present invention relates to a wireless communication system, and more particularly, to a method of detecting a synchronization signal for D2D (DEVICE-TO-DEVICE) communication in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

An object of the present invention is to provide a method of detecting a synchronization signal for D2D (DEVICE-TO-DEVICE) communication in a wireless communication system and an apparatus therefor.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of transceiving a synchronization signal, which is transceived by a user equipment (UE) for D2D (device-to-device) communication in a wireless communication system, includes monitoring a synchronization signal for D2D communication (D2DSS). In this case, the D2DSS can be assigned in an interval of a multiple raster unit from a center frequency.

Preferably, the center frequency can be obtained through a PSS (primary synchronization signal) and an SSS (secondary synchronization signal).

Preferably, the D2DSS can be transmitted at every multiple intervals of a period which a PSS (primary synchronization signal) and an SSS (secondary synchronization signal) are transmitted.

Preferably, the D2DSS can be transmitted through an uplink resource. More preferably, the D2DSS can be assigned to a position of a subcarrier identical to a subcarrier for downlink communication between an eNB and the UE. Preferably, the D2DSS can be assigned by an OFDM (orthogonal frequency division multiplexing) scheme. Or, the D2DSS can be positioned in an interval of a prescribed distance from a subcarrier for downlink communication between an eNB and the UE. Preferably, the prescribed distance can be configured to have an interval of 1/2 subcarrier from the subcarrier for the downlink communication.

Preferably, the D2DSS can be assigned in a period of 10 resource blocks (RBs).

Preferably, the D2DSS can be assigned in a multiple number of 300 kHz from the center frequency.

Advantageous Effects

According to the present invention, it is able to efficiently detect a synchronization signal for D2D communication in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram showing a control plane and a user plane of a radio interface protocol between a UE and an E-UTRAN based on a 3rd generation partnership project (3GPP) radio access network standard;

BEST MODE

Mode for Invention

Figure 1:
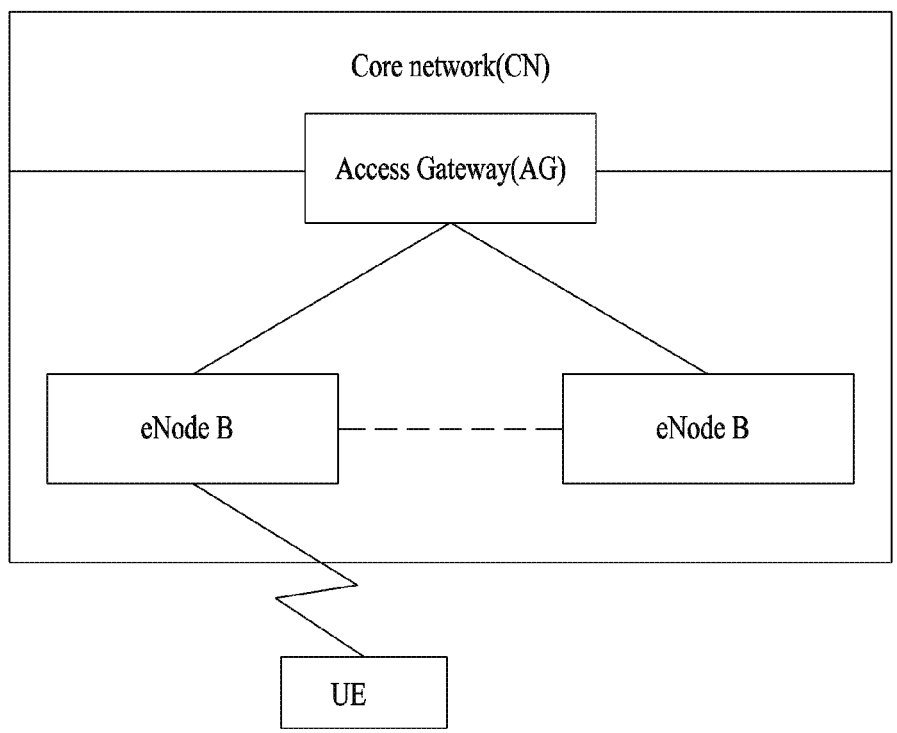
FIG. 1 is a diagram showing a network structure of an Evolved Universal Mobile Telecommunications System (E-UMTS) as an example of a wireless communication system.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
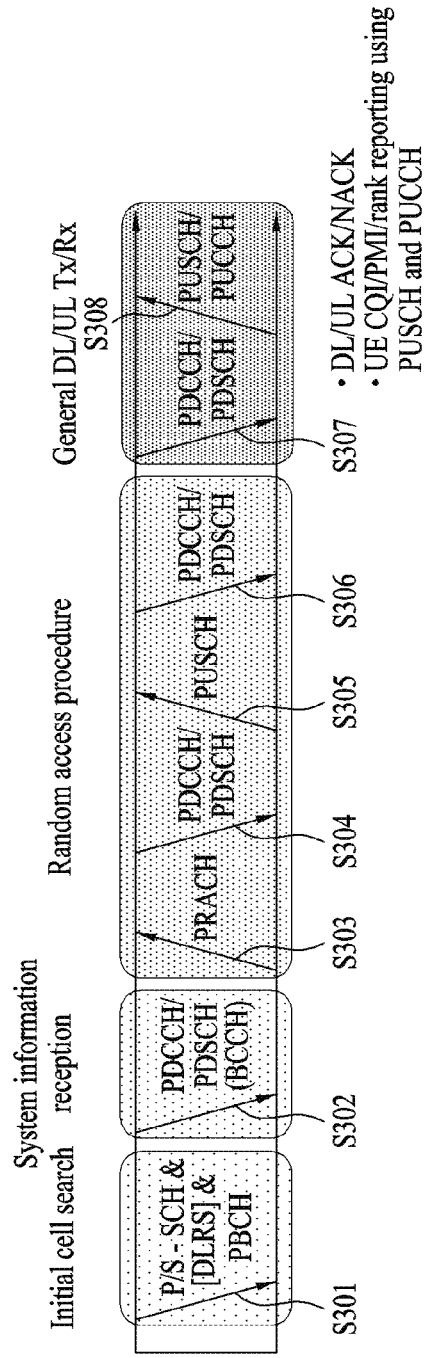
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
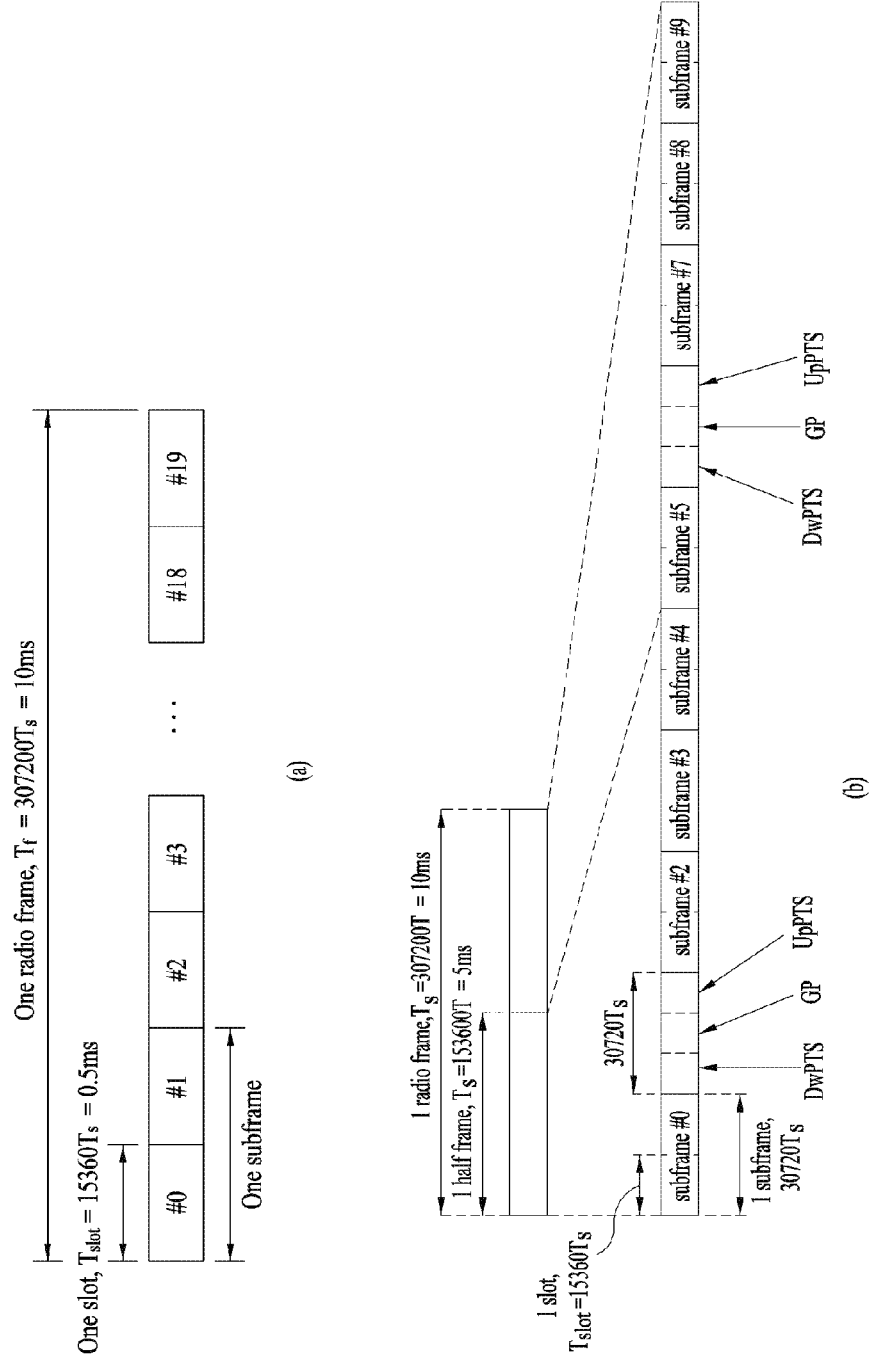
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes, a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE, whereas the UpPTS is used for channel estimation in an eNB and uplink transmission synchronization in a UE. That is, the DwPTS is used for a downlink transmission, the UpPTS is used for a uplink transmission, and, specifically, the UpPTS is used for a transmission of the PRACH preamble or a SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe. Additionally, in Table 2, downlink-uplink switching periodicity in the uplink/downlink subframe configuration of each system.

The above-described structure of the radio frame is merely exemplary. And, therefore, the number of subframes included in the radio frame or the number of slots included in a subframe, and the number of symbols included in one slot may be diversely varied.

Figure 5:
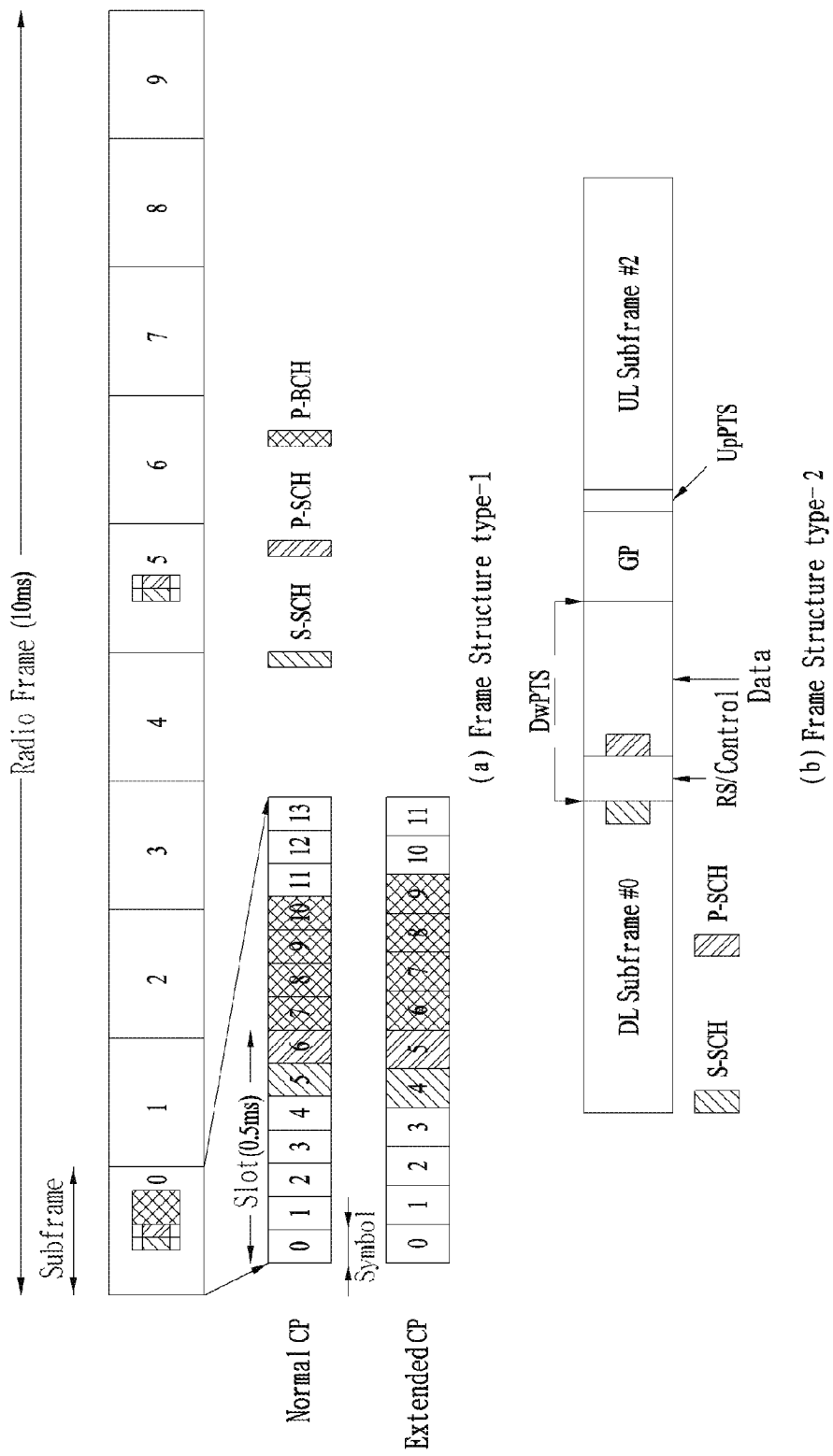
FIG. 5 illustrates a primary broadcast channel (P-BCH) and a synchronization channel (SCH) in a LTE system.

FIG. 5 illustrates a primary broadcast channel (P-BCH) and a synchronization channel (SCH). The SCH includes a primary synchronization channel (P-SCH) and a secondary synchronization channel (S-SCH). A primary synchronization signal (PSS) is transmitted on the P-SCH and a secondary synchronization signal (SSS) is transmitted on the S-SCH.

Referring to FIG. 5, in the frame structure type-1(i.e., FDD), the P-SCH is located at a last OFDM symbol in each of slot #0 (i.e., a first slot of subframe #0) and slot #10 (i.e., a first slot of subframe #5) per radio frame. The S-SCH is located at a previous OFDM symbol before the last OFDM symbol in each of slot #0 and slot #10 per radio frame. The S-SCH and the P-SCH are located at neighboring OFDM symbols. In the frame structure type-2(i.e., TDD), the P-SCH is transmitted through a third OFDM symbol in each of subframes #1 and #6. And, the S-SCH is located at a last OFDM symbol in each of slot #1 (i.e., a second slot of subframe #0) and slot #11 (i.e., a second slot of subframe #5). The P-BCH is transmitted in every four radio frames irrespective of the frame structure type. And, the P-BCH is transmitted using the first to fourth OFDM symbols in the second slot of the subframe #0.

The P-SCH is transmitted using 72 subcarriers (10 subcarriers are reserved and 62 subcarriers are used for PSS transmission) based on a DC (direct current) subcarrier in a corresponding OFDM symbol. The S-SCH is transmitted using 72 subcarriers (10 subcarriers are reserved and 62 subcarriers are used for SSS transmission) based on a DC subcarrier in a corresponding OFDM symbol. The P-BCH is mapped to 72 subcarriers based on a DC subcarrier and four OFDM symbols in one subframe.

Figure 6:
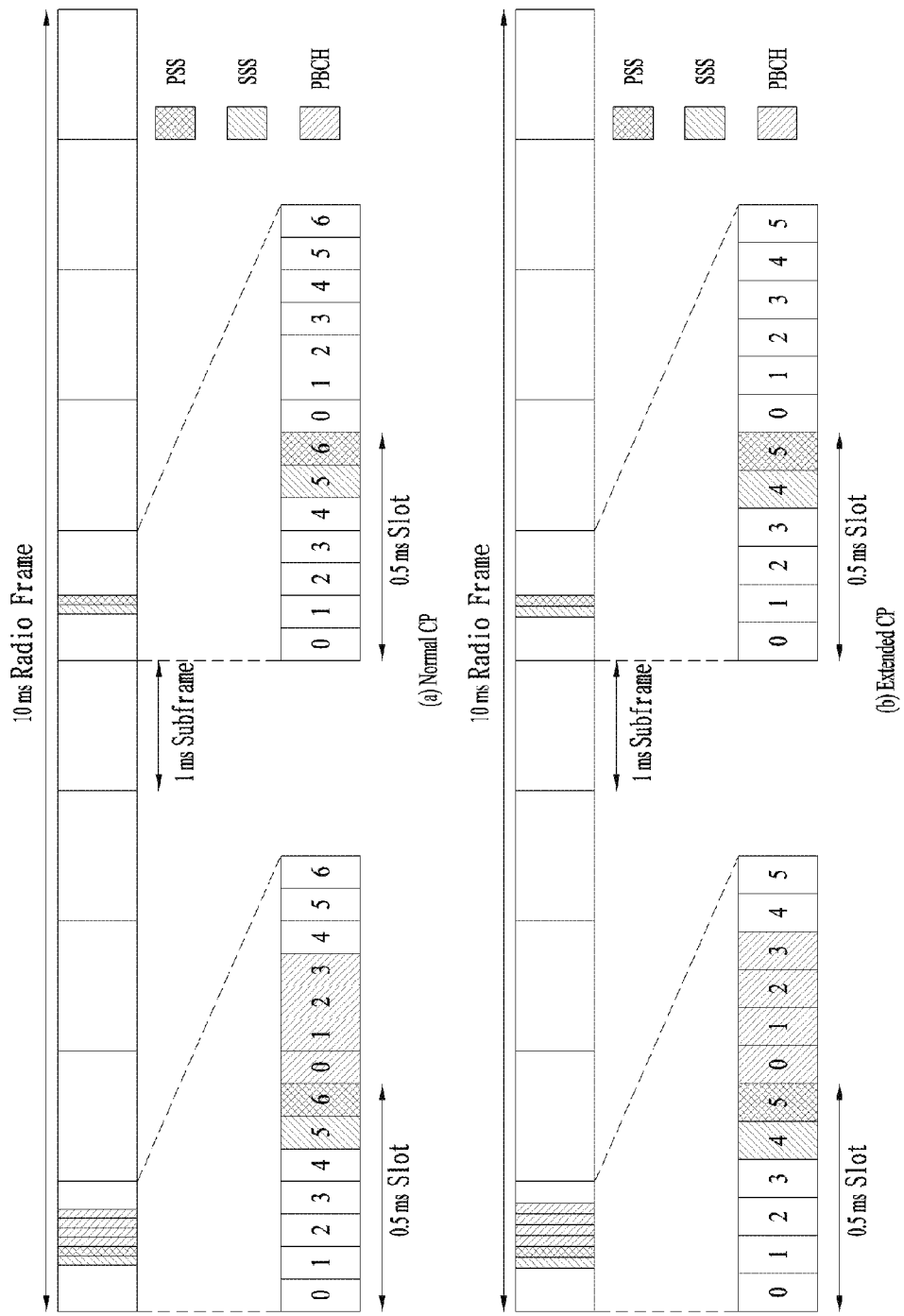
FIG. 6 illustrates a radio frame structure for transmission of a synchronization signal (SS)

FIG. 6 illustrates a radio frame structure for transmission of a synchronization signal (SS). Especially, FIG. 6 illustrates a radio frame structure for transmission of an SS and a PBCH in frequency division duplex (FDD), wherein FIG. 6(a) illustrates transmission locations of an SS and a PBCH in a radio frame configured with a normal cyclic prefix (CP) and FIG. 6(b) illustrates transmission locations of an SS and a PBCH in a radio frame configured with an extended CP.

If a UE is powered on or newly enters a cell, the UE performs an initial cell search procedure for obtaining time and frequency synchronization with the cell and detecting a physical cell identity of the cell. To this end, the UE may match synchronization with an eNB by receiving synchronization signals, e.g. a primary synchronization signal (PSS) and a secondary synchronization signal (SSS), from the eNB and then obtain information such as a cell identity (ID) and the like.

An SS will be described in more detail with reference to FIG. 6. An SS is categorized into a PSS and an SSS. The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 6, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ from 0 to 2 indicating a physical layer ID in the physical layer cell ID group (i.e., $N^{cell}_{ID} = 3N^{(1)}_{ID} + N^{(2)}_{ID}$). A UE can obtain one of the three unique physical layer IDs by detecting the PSS and then identify one, which is associated with the physical layer ID, among the 168 physical layer cell IDs in a manner of detecting the SSS. A Zadoff-Chu (ZC) sequence of length 63 is defined in a frequency domain and the sequence is used as the PSS. For example, the ZC sequence can be defined according to Equation 1 below.

$$d_u(n) = e^{-j\frac{\pi u n(n+1)}{N_{ZC}}}$$ [Equation 1]

In Equation 1, $N_{ZC}$=63 and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 and u=34 have a conjugate symmetry relation, two correlations may be simultaneously performed. In this case, the conjugate symmetry means the relationship in Equation 2 below.

$$d_u(n) = (-1)^n (d_{N_{ZC}-u}(n))^*, \text{ when } N_{ZC} \text{ is even number}$$
$$d_u(n) = (d_{N_{ZC}-u}(n))^*, \text{ when } N_{ZC} \text{ is odd number}$$ [Equation 2]

A one-shot correlator for u=29 and u=34 can be implemented using conjugate symmetry characteristics. Moreover, compared to a case without the conjugate symmetry, the total amount of calculation can be reduced by about 33.3%.

In more detail, a sequence d(n) used for the PSS can be generated from a frequency-domain ZC sequence according to Equation 3 below.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$ [Equation 3]

In Equation 3, a ZC root sequence index u can be given according to Table 3 below.

TABLE 3

| $N^{(2)}_{ID}$ | Root index u |
|---|---|
| 0 | 25 |
| 1 | 29 |
| 2 | 34 |

Referring to FIG. 6, by detecting the PSS, a UE may know that a corresponding subframe is one of subframe 0 and subframe 5 since the PSS is transmitted every 5 ms but the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame in a manner of detecting an SSS which is transmitted twice in one radio frame with different sequences.

Figure 7:
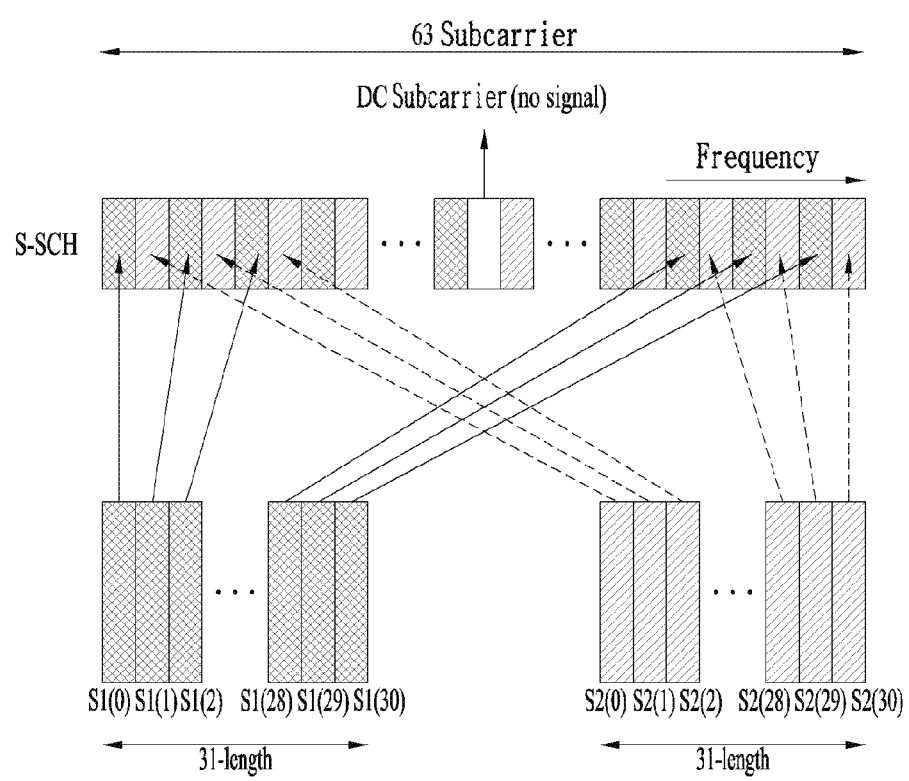
FIG. 7 is a diagram for explaining a scheme of generating a secondary synchronization signal (SSS)

FIG. 7 is a diagram for explaining a scheme of generating a secondary synchronization signal (SSS). In particular, FIG. 7 illustrates a mapping relation of two sequences between a logical domain and a physical domain.

A sequence used for the SSS corresponds to an interleaved concatenation of two m-sequences each of length 31. The concatenated sequence is scrambled by a scrambling sequence given by the PSS. In this case, the m-sequence is a kind of a pseudo noise (PN) sequence.

Referring to FIG. 7, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on an S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. And, total 31 codes can be generated through different cyclic shifts of an m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation of the UE can also be reduced.

Generation of the SSS is described in more detail. Sequences of $d(0), \ldots, d(61)$ used for the SSS are an interleaved concatenation of two binary sequences, each of which has length 31. The concatenated sequence is scrambled by a sequence given by the PSS.

A combination of two sequences, each of which has length 31, used for defining the PSS can be different in subframe 0 and subframe 5 according to Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$ [Equation 4]

In Equation 4, $0 \leq n \leq 30$. Indices $m_0$ and $m_1$ are derived from the physical layer cell identity group $N^{(1)}_{ID}$ according to Equation 5.

$$m_0 = m' \bmod 31$$ [Equation 5]

$$m_1 = (m_0 + \lfloor m'/31 \rfloor + 1) \bmod 31$$

$$m' = N^{(1)}_{ID} + q(q+1)/2,$$

$$q = \left\lfloor \frac{N^{(1)}_{ID} + q'(q'+1)/2}{30} \right\rfloor, q' = \lfloor N^{(1)}_{ID}/30 \rfloor$$

The output in Equation 5 will be listed in Table 4 after Equation 11.

Two sequences $S^{(m0)0}(n)$ and $S^{(m1)1}(n)$ are defined as two different cyclic shifts of an m-sequence $s(n)$ according to Equation 6.

$$s_0^{(m_0)}(n) = s((n+m_0) \bmod 31)$$

$$s_1^{(m_1)}(n) = s((n+m_1) \bmod 31)$$ [Equation 6]

In Equation 6, $s(i)=1-2x(i)$ (where $0 \leq i \leq 30$) is defined according to Equation 7 with initial conditions $x(0)=0$, $x(1)=0$, $x(2), x(3)=0$, and $x(4)=1$.

$$x(\bar{i}+5)=(x(\bar{i}+3)+x(\bar{i})) \bmod 2, \; 0 \leq \bar{i} \leq 25$$ [Equation 7]

Two scrambling sequences $c_0(n)$ and $c_1(n)$ depend on the PSS and are defined by two different cyclic shifts of an m-sequence $c(n)$ according to Equation 8.

$$c_0(n)=c((n+N^{(2)}_{ID}) \bmod 31)$$

$$c_1(n)=c((n+N^{(2)}_{ID}+3) \bmod 31)$$ [Equation 8]

In Equation 8, $N^{(2)}_{ID} \in \{0, 1, 2\}$ is a physical layer identity in the physical layer cell identity group $N^{(1)}_{ID}$ and $c(i)=1-2x(i)$ (where $0 \leq i \leq 30$) is defined according to Equation 9 with initial conditions $x(0)=0$, $x(1)=0$, $x(2), x(3)=0$, and $x(4)=1$.

$$x(\bar{i}+5)=(x(\bar{i}+3)+x(\bar{i})) \bmod 2, \; 0 \leq \bar{i} \leq 25$$ [Equation 9]

Scrambling sequences $Z^{(m0)1}(n)$ and $Z^{(m1)1}(n)$ are defined by cyclic shifts of an m-sequence $z(n)$ according to Equation 10.

$$z_1^{(m0)}((n+(m_0 \bmod 8)) \bmod 31)$$

$$z_1^{(m1)}((n+(m_1 \bmod 8)) \bmod 31)$$ [Equation 10]

In Equation 10, $m_0$ and $m_1$ are obtained from Table 4 after Equation 11 and $z(i)=1-2x(i)$ (where $0 \leq i \leq 30$) is defined according to Equation 11 with initial conditions $x(0)=0$, $x(1)=0$, $x(2), x(3)=0$, and $x(4)=1$.

$$x(\bar{i}+5)=(x(\bar{i}+4)+x(\bar{i}+2)+x(\bar{i}+1)+x(\bar{i})) \bmod 2, \; 0 \leq \bar{i} \leq 25$$ [Equation 11]

TABLE 4

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |

TABLE 4-continued

| $N^{(1)}_{ID}$ | $m_0$ | $m_1$ |
|---|---|---|
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Having demodulated a DL signal by performing a cell search procedure using the SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIBS to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable in cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having accessed the network served by the eNB after completing the initial cell search, the UE is able to obtain more detailed system information by receiving PDCCH and PDSCH according to information carried on the PDCCH. After performing the above-described procedure, the UE may perform PDCCH/PDSCH reception and PUSCH/PUCCH transmission as a general UL/DL signal transmission procedure.

Figure 8:
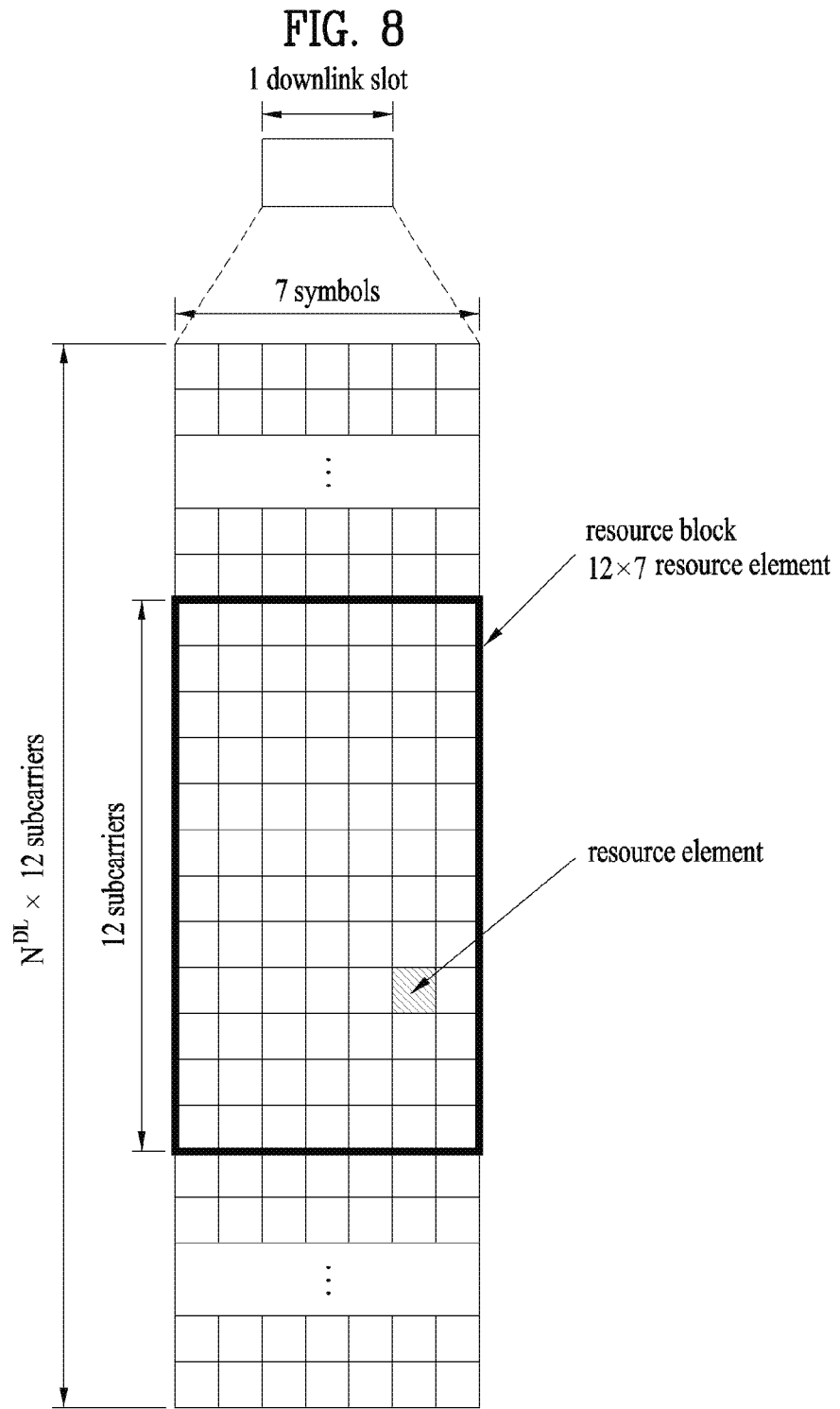
FIG. 8 is a diagram showing a resource grid for a downlink slot.

FIG. 8 illustrates a resource grid for a downlink slot.

Referring to FIG. 8, a downlink slot includes $N_{symb}^{DL}$ OFDM symbols in a time domain and $N_{RB}^{DL}$ resource blocks in a frequency domain. Since each resource block includes $N_{sc}^{RB}$ subcarriers, the downlink slot includes $N_{RB}^{DL} \times N_{SC}^{RB}$ subcarriers in the frequency domain. Although FIG. 8 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} \times N_{sc}^{RB}$ resource elements. The number $N_{RB}^{DL}$ of resource blocks included in the downlink slot depends on a downlink transmission bandwidth configured in a cell.

Figure 9:
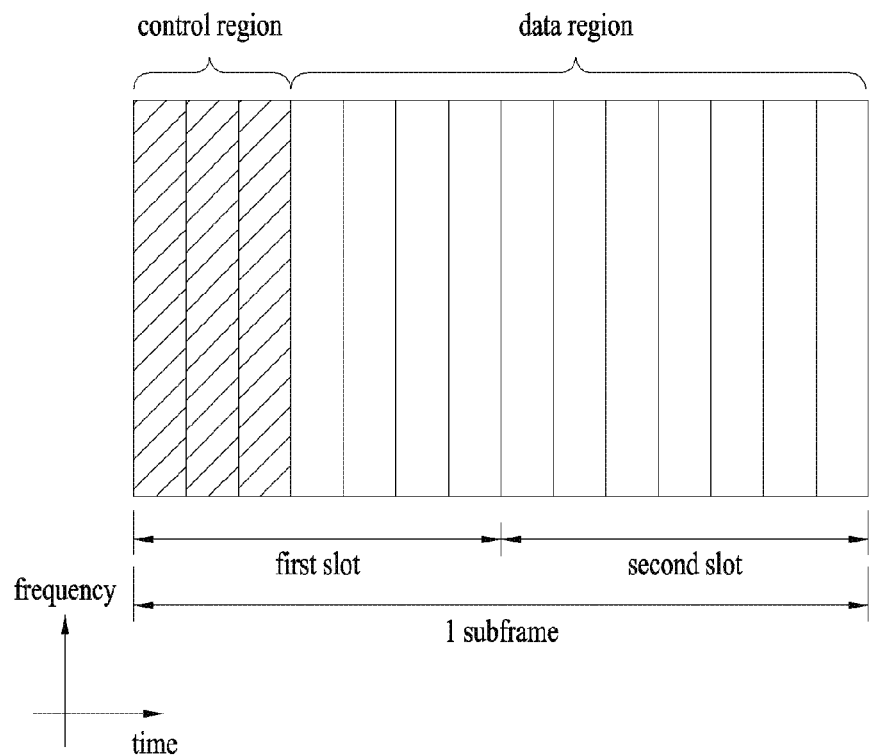
FIG. 9 illustrates an example of a downlink subframe structure.

FIG. 9 illustrates a downlink subframe structure.

Referring to FIG. 9, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 10:
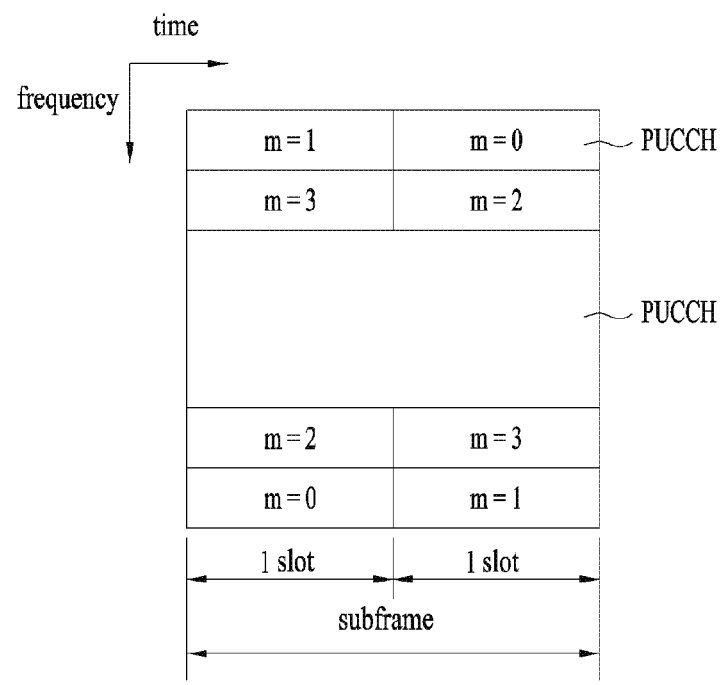
FIG. 10 is a diagram showing a structure of an uplink subframe used in LTE.

FIG. 10 illustrates a structure of an uplink subframe used in LTE.

Referring to FIG. 10, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.
- SR (scheduling request): Information used to request UL-SCH resources. This is transmitted using an on-off keying (OOK) scheme.
- HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.
- CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

Figure 11:
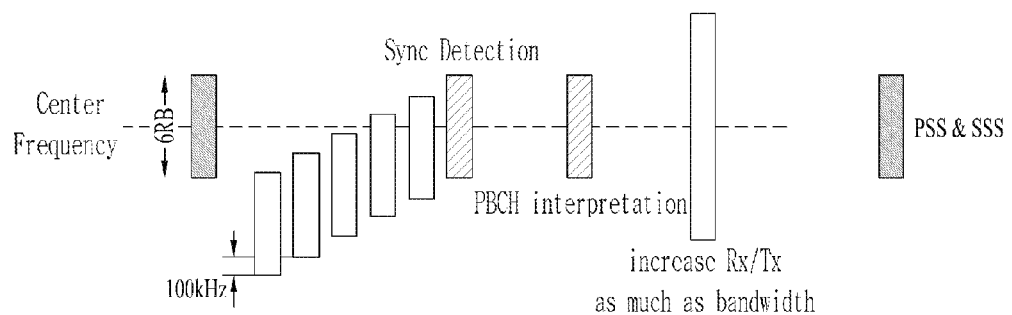
FIG. 11 is a diagram for explaining a synchronization procedure of a cellular UE.

FIG. 11 is a diagram for explaining a synchronization procedure of a cellular UE. Cellular synchronization of LTE UE and an initial access procedure are explained with reference to FIG. 11 in the following.

A UE sequentially monitors a frequency value as much as available minimum frequency bandwidth (6RBs, 1.08 MHz) with a channel raster (e.g., 100 kHz) interval. A raster corresponds to a minimum unit of a UE reading a resource. The raster has a value of 100 kHz in LTE system. In this case, if energy is detected in a specific raster, more detail synchronization is performed using PSS and SSS. By doing so, a UE is able to more accurately obtain a center frequency. Subsequently, the UE receives PBCH and reads an operational bandwidth positioned at MIB. By doing so, the UE is able to obtain a bandwidth of the UE. Subsequently, control information and data can be transmitted and received on the basis of the bandwidth of the UE.

When D2D communication is introduced in the aforementioned wireless communication system (e.g., 3GPP LTE system or 3GPP LTE-A system), specific methods for performing the D2D communication are described hereinafter.

Figure 12:
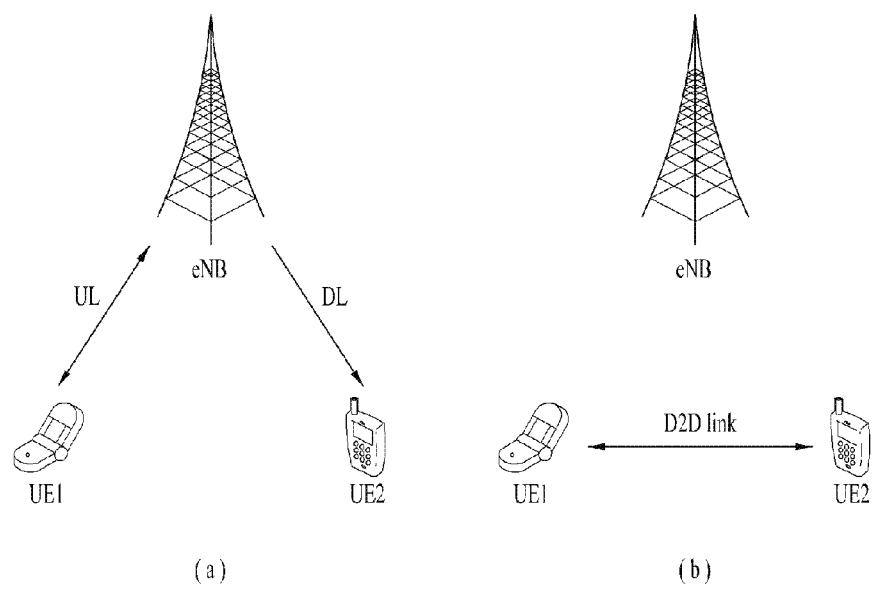
FIG. 12 illustrates D2D communication.

FIG. 12 is a conceptual diagram for explaining D2D communication. FIG. 12 (a) shows a conventional eNB-based communication scheme. According to the conventional eNB-based communication scheme in FIG. 12 (a), a first UE (UE1) can transmit data to an eNB in uplink and the eNB can forward data transmitted from the first UE (UE1) to a second UE (UE2) in downlink.

FIG. 12 (b) shows a UE-to-UE communication scheme as an example of D2D communication. According to the UE-to-UE communication scheme in FIG. 12 (b), data exchange between UEs can be performed without intervention of the eNB. A link directly established between such devices can be called a D2D link. Compared to the conventional eNB-based communication scheme, the D2D communication has advantages in that latency is reduced and a small amount of resources is required.

Although the D2D communication corresponds to a scheme for supporting device-to-device (or UE-to-UE) communication without intervention of the eNB, the D2D communication should not cause interference or disturbance to a conventional wireless communication system (e.g., 3GPP LTE/LTE-A) since it is performed in a manner of reusing resources in the conventional wireless communication system. In this context, it is also important to minimize interference caused to the D2D communication by a UE or an eNB operating in the conventional wireless communication system.

In the following, when UEs performing D2D communication perform synchronization between the UEs, a method of allocating a transmitted resource is explained based on the aforementioned contents in the present invention.

When a D2D UE belongs to the coverage of an eNB, since the D2D UE performs D2D communication with a different UE while maintaining communication (UE-to-eNB) with the eNB, it is necessary for the D2D UE to perform more calculations compared to a cellular UE. Hence, the present invention proposes an allocation method for reducing unnecessary operation of a D2D synchronization procedure using a D2D synchronization signal.

In the following, for clarity, the present invention is described on the basis of LTE system. However, the present invention can also be commonly applied to an OFDM system using a time-frequency domain in a grid form by dividing the time-frequency domain or a wireless communication system of a similar scheme.

Figure 13:
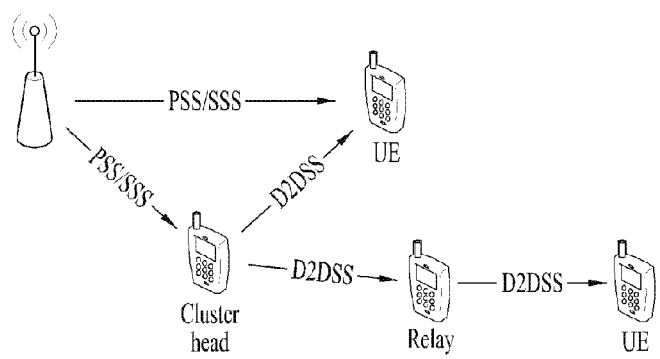
FIG. 13 is a diagram for explaining D2DSS to which the present invention is applied.

FIG. 13 is a diagram for explaining D2DSS to which the present invention is applied. As shown in FIG. 13, a cluster head (a relay or a D2D transmission UE (hereinafter D2D Tx)) transmits a D2DSS (D2D synchronization signal) for D2D and D2D communication performs transmission and reception on the basis of the D2DSS. Meanwhile, since it is necessary for a UE (a relay or a D2D TX) not only to receive a D2DSS for D2D communication but also to maintain access with an eNB at the same time, the UE should receive a PSS/SSS as well. In this case, assume that the D2DSS and the PSS/SSS are multiplexed in an identical subframe (SF) using a 1-DM scheme. Yet, it is not necessary to transmit the D2DSS in every PSS/SSS subframe (SF). In particular, since the D2DSS has a multiple period of a period of the PSS/SSS, the D2DSS may not be detected in a specific PSS/SSS subframe depending on time.

Additionally, although the PSS/SSS is always transmitted to an identical location of a center frequency 6RB, the D2DSS may have a different location depending on a cluster head (or a D2D TX) on a frequency band. And, a location to which the D2DSS is assigned may vary according to time or vary with a certain period to avoid collision between D2DSSs. In this case, the D2DSS may have hopping information or offset information or a following separate signal may inform the D2DSS of the hopping information or the offset information to enable the D2DSS to determine a point of a certain offset as a center frequency.

The D2DSS has a structure similar to the PSS/SSS. The D2DSS has a part of differences described in the following with the PSS/SSS. In some cases, the D2DSS has all of differences described in the following with the PSS/SSS. If the D2DSS has a difference with the PSS/SSS, each signal constructing the D2DSS may be referred to as a primary D2DSS (PD2DSS) and a secondary D2DSS (SD2DSS) to distinguish the D2DSS from the PSS/SSS. The PD2DSS and the SD2DSS can be designed based on the PSS/SSS. Although FIG. 11 is represented as the D2DSS occupies one subframe, it is not mandatory that the D2DSS occupies the entire one subframe. Although the D2DSS is transmitted over partial symbols of the subframe or several subframes, the present invention can also be applied.

Difference in repeating count: PSS/SSS is transmitted one time only in a subframe. A plurality of PSSs/SSSs are transmitted in a subframe at a time Root index: D2DSS may have a root index different from a root index of PSS/SSS. As an example, while PD2DSS is generated based on a sequence generation scheme used in PSS, the PD2DSS uses a root index not used in the PSS.

Length: D2DSS can be configured by a sequence of a length different from a length of PSS/SSS.

Figure 14:
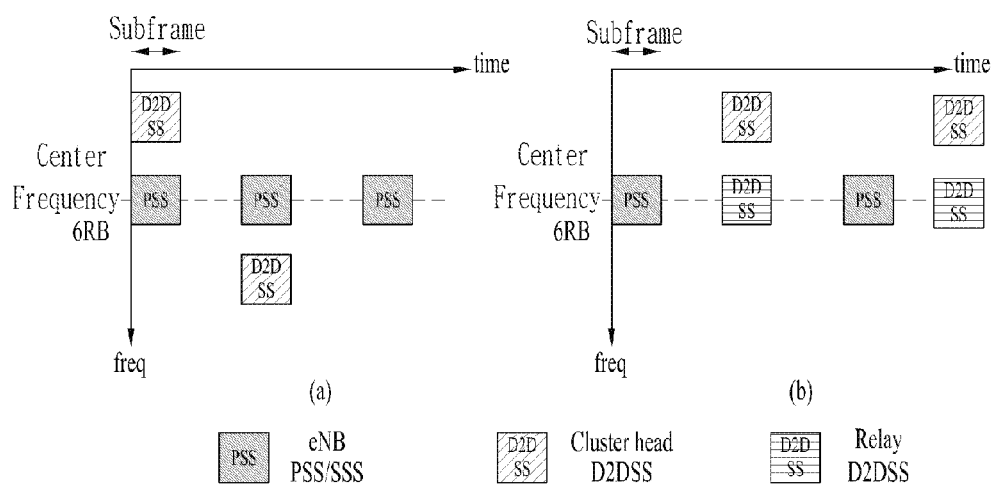
FIG. 14 is a diagram for explaining resource deployment of D2DSS according to the present invention.

FIG. 14 is a diagram for explaining resource deployment of D2DSS according to the present invention. Referring to FIG. 14, the present invention proposes to assign a D2DSS signal of a cluster head to a position apart from a center frequency as much as multiple spaces of a raster (100 kHz).

In particular, as shown in FIG. 14 (a), since a basic unit of legacy LTE system corresponds to an RB, if a D2DSS is assigned to a position apart from a center frequency as much as certain RBs, although a UE has successfully received a PSS/SSS, the UE should monitor the whole frequency band again in a raster unit to receive the D2DSS. Or, it is necessary to perform 2 analog-to-digital converting at the same time (i.e., it is necessary to have two or more ADCs). Hence, it is necessary to perform monitoring operation two times in total.

On the contrary, as shown in FIG. 14 (*b*), if a D2DSS is assigned to a position apart from a center frequency as much as multiples of a raster size according to the present invention, a UE monitors all frequency bands with a channel raster space. In this case, if a D2DSS is detected, the UE performs D2D synchronization. If a PSS/SSS is detected, the UE performs cellular synchronization. In particular, it is able to match both D2D synchronization and cellular synchronization by a single monitoring operation. A candidate position of a D2DSS is restricted to a position apart from a center frequency as much as multiples of a raster size. By doing so, it is able to more promptly detect a D2DSS, which is intermittently transmitted compared to a PSS/SSS. This is because a position of a raster capable of transmitting a D2DSS is reduced compared to a PSS/SSS. Although a specific raster is cable of transmitting both the PSS/SSS and the D2DSS, a different raster is unable to transmit the D2DSS while capable of transmitting the PSS/SSS.

Figure 15:
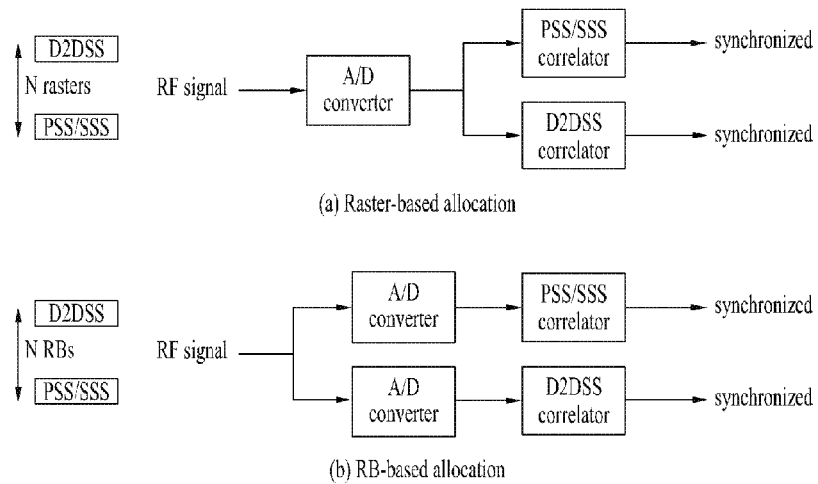
FIG. 15 is a diagram for explaining a synchronization structure according to the present invention.

FIG. 15 is a diagram for explaining a synchronization structure according to the present invention. The modules (i.e., A/D converter, correlator) shown in FIG. 15 are implemented as an individual module for clarity. When the modules are configured as a single module configured to perform all functions, it may also correspond to an embodiment of the present invention.

FIG. 15 (*a*) shows a raster-based synchronization structure according to the present invention. In particular, when all frequency bands are monitored with a channel raster interval, if a PSS/SSS or a D2DSS is detected, synchronization is performed by one monitoring through a correlator respectively corresponding to the PSS/SSS and the D2DSS. On the contrary, as shown in FIG. 15 (*b*), in case of an RB-based synchronization structure, since a D2DSS is assigned to a position apart from a center frequency as much as prescribed RBs, although a UE has successfully received a PSS/SSS, the UE should monitor all frequency bands again in a raster unit to receive the D2DSS. Hence, it is necessary to have two A/D converters.

Moreover, in LTE, since one subcarrier has a size of 15 kHz, it is preferable to assign a raster-based D2DSS shown in FIG. 15 (*a*) with a multiple number of 15 kHz. In particular, it is preferable to assign a D2DSS while a point apart from a cellular center frequency as much as a 300 kHz unit (300 kHz, 600 kHz, 900 kHz, . . . ) corresponding to a multiple number of 15 kHz and a raster size 100 kHz is determined as a center frequency. In this case, the center frequency has a meaning of a center of a system bandwidth (as a different meaning, a center of a 1-FT window configuration). Actual D2DSS transmission may not be symmetrical on the basis of a center according to a configuration of a guard subcarrier positioned at before and after the D2DSS.

Figure 16:
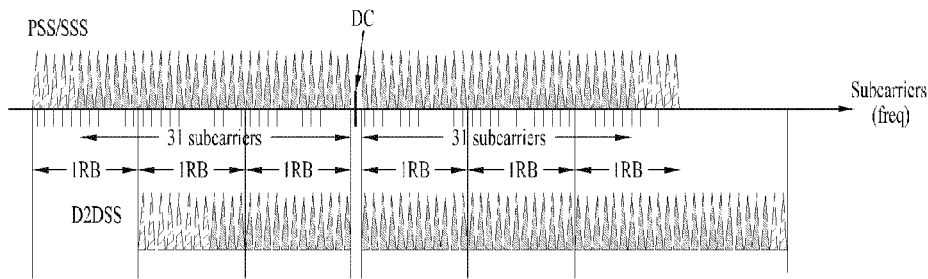
FIG. 16 is a diagram for explaining a case that D2DSS transmission is not symmetrical on the basis of a center frequency.

FIG. 16 is a diagram for explaining a case that D2DSS transmission is not symmetrical on the basis of a center frequency. In FIG. 16, assume that a D2DSS corresponds to a 63-length sequence similar to a PSS/SSS and the D2DSS is assigned in a manner of being apart from a center as much as 300 kHz (15 subcarriers). Moreover, for clarity, assume that subcarrier overlapping is not considered.

Referring to FIG. 16, a PSS/SSS has 5 guard subcarriers in each of the left/right side of a frequency. On the contrary, a D2DSS has 8 guard subcarriers and 2 guard subcarriers in the left and the right side, respectively, to match an RB boundary. FIG. 16 is just an example. The aforementioned configuration may vary according to DC puncturing or a configuration of a D2DSS.

Meanwhile, in case of uplink (UL), a UL subcarrier is positioned at a location apart from downlink (DL) synchronization as much as a space of 1/2 subcarrier due to a characteristic of SC-FDMA. In this case, synchronization between a D2DSS and a D2D UE can be performed using one of schemes described in the following.

1) A D2DSS is transmitted in a manner of being identical to DL (until an identical subcarrier position and DC puncturing) and a reception UE performs synchronization. In particular, the reception UE can be precisely synchronized with DL. In this case, transmission and reception are performed in a manner of being dislocated as much as 1/2 subcarrier spacing regarding the remaining D2D operations.

2) A subcarrier is positioned at a point which is shifted into the left/right side as much as 1/2 subcarrier from synchronization (center frequency of a PSS/SSS) of DL and then a D2DSS is transmitted. In this case, DC puncturing does not occur due to a characteristic of SC-FDMA. Since synchronization obtained from the D2DSS is already dislocated with DL as much as 1/2 subcarrier, a reception UE performs transmission and reception on the basis of the synchronization.

Figure 17:
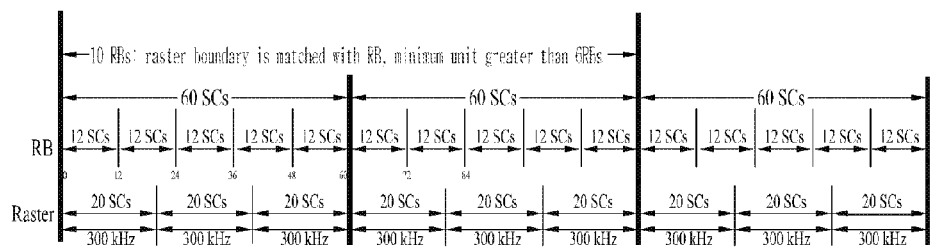
FIG. 17 is a diagram for explaining an embodiment of transmitting D2DSS in a manner of matching a boundary of an RB corresponding to a legacy resource unit with a boundary of a raster according to the present invention.

FIG. 17 is a diagram for explaining an embodiment of transmitting D2DSS in a manner of matching a boundary of an RB corresponding to a legacy resource unit with a boundary of a raster according to the present invention. Referring to FIG. 16, resources are divided by a unit of 300 kHz to match a boundary of a subcarrier and a boundary of 100 kHz channel raster with each other. Unlikely, as shown in FIG. 17, it may perform transmission in a manner of matching an RB boundary corresponding to a legacy resource unit with a raster boundary. In this case, a resource unit capable of transmitting a D2DSS can be calculated as follows.

Subframe boundary: 15 kHz
Raster boundary: 100 kHz
→300 kHz raster is repeated in every 20 subcarriers (SCs)
Number of subcarriers of RB: 12 subcarriers (SCs)
→Raster and an RB boundary are matched with each other in every 60 SCs corresponding to the least common multiple of (20,12), i.e., a period of 5 RBs
If 6RB D2DSS is assumed, a resource period of the D2DSS becomes an immediately next period greater than 5 RBs
→100 kHz raster, an RB boundary and a subframe boundary are all matched with 10-RB period In particular, a D2DSS can be transmitted in a resource unit of 10 RBs. A position of the D2DSS in each 10 RB unit 1) can be located at the center of 10 RBs, 2) can be stretched out to the left and the right in accordance with a specific 100 kHz channel raster among the 10 RBs or 3) a start or an end of the D2DSS can be matched with a start or an end of a 10-RB resource.

In the foregoing description, it is assumed as a PSS/SSS and a D2DSS are transmitted in a single subframe at the same time. In this case, if the D2DSS is assigned in a manner of being apart from a center frequency with a multiple number of 300 kHz, it is able to reduce complexity even when the D2DSS is transmitted in a different point rather than the PSS/SSS subframe.

Figure 18:
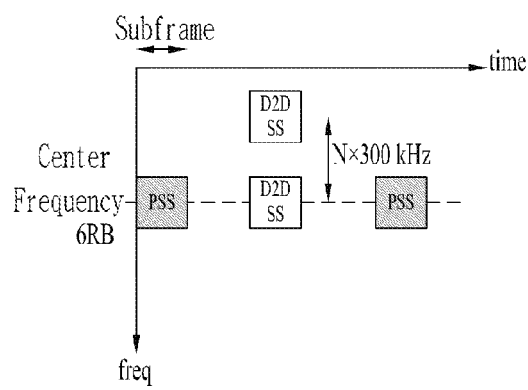
FIG. 18 is a diagram for an embodiment that D2DSS is not transmitted in a same subframe in which PSS/SSS is transmitted according to the present invention.

FIG. 18 is a diagram for an embodiment that D2DSS is not transmitted in a same subframe in which PSS/SSS is transmitted according to the present invention.

Referring to FIG. 18, in case of a UE synchronized with an eNB by preferentially detecting a PSS/SSS, the UE can perform D2D synchronization at a center frequency using restricted monitoring only. In particular, as shown in FIG. 18, if a D2DSS is assigned based on an RB, it is necessary to monitor the whole band with a unit of 100 kHz on the basis of a center frequency to detect the D2DSS and calculate an RB boundary whenever the monitoring is performed to detect a center frequency of the D2DSS. On the contrary, if raster-based D2DSS assignment is performed, since a D2DSS is apart from a center frequency as much as a multiple number of 300 kHz, a monitoring target can be reduced as much as 1/3. Moreover, since a center frequency of the D2DSS is matched with a center frequency of a monitoring band, it is not necessary to calculate a boundary of the D2DSS.

FIG. 18 illustrates that a D2DSS is assigned to a point apart from a cellular center frequency as much as N*300 kHz. In this case, N may correspond to 0. In particular, the D2DSS can be assigned to a center frequency as well. In this case, synchronization of the D2DSS can be detected in the aforementioned monitoring procedure.

As an apparent extension of the present invention, when a PSS/SSS and a D2DSS are synchronized at the same time or when a plurality of D2DSSs exist in a single SF at the same time, in case of in-NW UE, the in-NW UE can detect a plurality of the D2DSSs or select one from among a plurality of the D2DSSs by performing monitoring in a unit of 300 kHz on the basis of a cellular center frequency. Meanwhile, in case of out of NW UE, the out of NW UE can monitor (a plurality of) D2DSSs in a raster unit of 100 kHz and detect (a plurality of) the D2DSSs instead of a PSS/SSS.

On the contrary, when a D2DSS is transmitted at a center of a bandwidth only or when a position of a D2DSS is induced from a position of a PSS/SSS, since the in-NW UE has already obtained the center of the bandwidth through a PSS/SSS detection procedure, it is not necessary to perform raster search to detect the D2DSS. Hence, a raster of the D2DSS transmitted by the in-NW UE can be configured to have an interval identical to a raster of the PSS/SSS. On the contrary, since it is necessary for the out of NW UE to identify a system bandwidth using a D2DSS only while failing to detect a PSS/SSS, if the out of NW UE uses a raster structure identical to the PSS/SSS, as mentioned in the foregoing description, D2DSS detection becomes excessively complex. Hence, an interval of a raster for transmitting a D2DSS, which is transmitted by the out of NW UE, can be configured to be multiple number of a raster interval of the PSS/SSS. Due to the same reason, a UE attempting to detect a D2DSS at the outside of a network attempts to detect the D2DSS with a multiple interval of the PSS/SSS raster interval. If a specific UE intends to transmit a D2DSS to the outside of a network from the inside of the network, the network should configure the D2DSS to be matched with a raster attempting to detect the D2DSS at the outside of the network.

Figure 19:
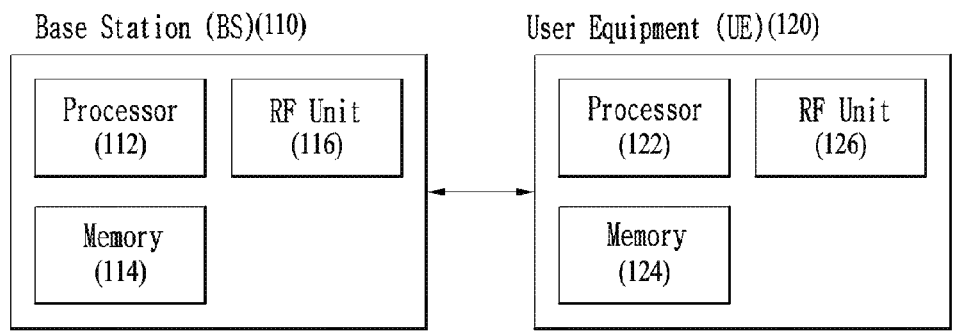
FIG. 19 illustrates a base station and a UE that may be applied to one embodiment of the present invention.

FIG. 19 is a diagram of a base station and a user equipment applicable to one embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 19, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of detecting a synchronization signal for D2D (device-to-device) communication in a wireless communication system and an apparatus therefor are mainly described along with examples applied to 3GPP LTE system, it may be applicable to various wireless communication systems as well as to the 3GPP LTE system

What is claimed is:

1. A method of transceiving a synchronization signal by a user equipment (UE) for D2D (device-to-device) communication in a wireless communication system, comprising:
receiving, from another D2D UE, a D2D communication synchronization signal (D2DSS) assigned in a specific frequency; and
monitoring the D2DSS based on the specific frequency,
wherein the specific frequency to which the D2DSS is assigned is spaced from a center frequency by a multiple of raster unit frequency, and
wherein the center frequency is obtained through a PSS (primary synchronization signal) and an SSS (secondary synchronization signal).

2. The method of claim 1, wherein a root index of the D2DSS is different from a root index of the PSS.

3. The method of claim 1, wherein the D2DSS is transmitted through an uplink resource.

4. The method of claim 3, wherein the D2DSS is assigned to a position of a subcarrier identical to a subcarrier for downlink communication between an eNB and the UE.

5. The method of claim 4, wherein the D2DSS is assigned by an OFDM (orthogonal frequency division multiplexing) scheme.

6. The method of claim 3, wherein the D2DSS is positioned in an interval of a prescribed distance from a subcarrier for downlink communication between an eNB and the UE.

7. The method of claim 6, wherein the prescribed distance is configured to have an interval of 1/2 subcarrier from the subcarrier for the downlink communication.

8. The method of claim 1, wherein the D2DSS is assigned in a period of 10 resource blocks (RBs).

9. The method of claim 1, wherein the D2DSS is assigned in a multiple number of 300 kHz from the center frequency.

* * * * *